United States Patent [19]

Blanding et al.

[11] Patent Number: 5,237,348
[45] Date of Patent: Aug. 17, 1993

[54] METHOD AND APPARATUS FOR ALIGNMENT OF SCAN LINE OPTICS WITH TARGET MEDIUM USING EXTERNAL ADJUSTING MEMBERS

[75] Inventors: Douglas L. Blanding, Rochester; Michael E. Harrigan, Webster; David Kessler; Drew D. Summers, both of Rochester, all of N.Y.

[73] Assignee: Eastman Kodak Company, Rochester, N.Y.

[21] Appl. No.: 786,122

[22] Filed: Oct. 31, 1991

[51] Int. Cl.$^5$ .................. G03G 15/04; G01D 15/14
[52] U.S. Cl. .................................. 346/160; 346/108; 29/464; 359/198
[58] Field of Search ............... 346/108, 160; 359/198; 250/206.1, 208.2; 29/464

[56] References Cited

U.S. PATENT DOCUMENTS

| | | |
|---|---|---|
| 3,922,060 | 11/1975 | Oosaka et al. . |
| 4,040,097 | 8/1977 | Mizuno ................... 360/2 |
| 4,043,632 | 8/1977 | Jeffrey et al. . |
| 4,239,326 | 12/1980 | Kramer . |
| 4,243,293 | 1/1981 | Kramer . |
| 4,297,713 | 10/1981 | Ichikawa et al. ................ 346/108 |
| 4,304,459 | 12/1981 | Kramer . |
| 4,397,521 | 8/1983 | Antos et al. . |
| 4,487,472 | 12/1984 | Asano . |
| 4,826,268 | 5/1989 | Kramer . |
| 4,904,034 | 2/1990 | Narayan et al. . |
| 4,977,412 | 12/1990 | Komori et al. ................ 346/108 |
| 5,151,810 | 9/1992 | Blanding et al. ................ 359/198 |

*Primary Examiner*—Joan H. Pendegrass
*Attorney, Agent, or Firm*—Warren L. Franz

[57] ABSTRACT

Positioning of a scan line (L) relative to a recording medium drum (15) of a polygon printer is established by independently adjusting blocks (35, 36) mounted on a scan line generating optics module (10) through adjustments made to an external beam sensing fixture (52). Inverted V-notches (38) used for nesting the blocks (35, 36) onto cylindrical surfaces of drum bearings (33) are nested onto corresponding cylindrical surfaces of fixture ends (54, 55). X, z, $\theta_x$ and $\theta_z$ positions are then set by x and z direction adjustment screws (44, 45, 49, 50) mounted on a support structure (73) to make adjustments in the fixture positions against the bias of springs (100). Clamping screws (45, 46) pass through oversized holes (47, 48) on blocks (35, 36) to releasably lock blocks (35, 36) after adjustment. The z direction adjustment includes levers (85) and dual ball socket assemblies (95, 96, 97) so that adjustment of the $\theta_y$ position of fixture (52) will simultaneously occur to maintain a constant angle of incidence during adjustment, in response to the travel of a wheeled member (60) against a constant radius frame surface (70).

17 Claims, 3 Drawing Sheets

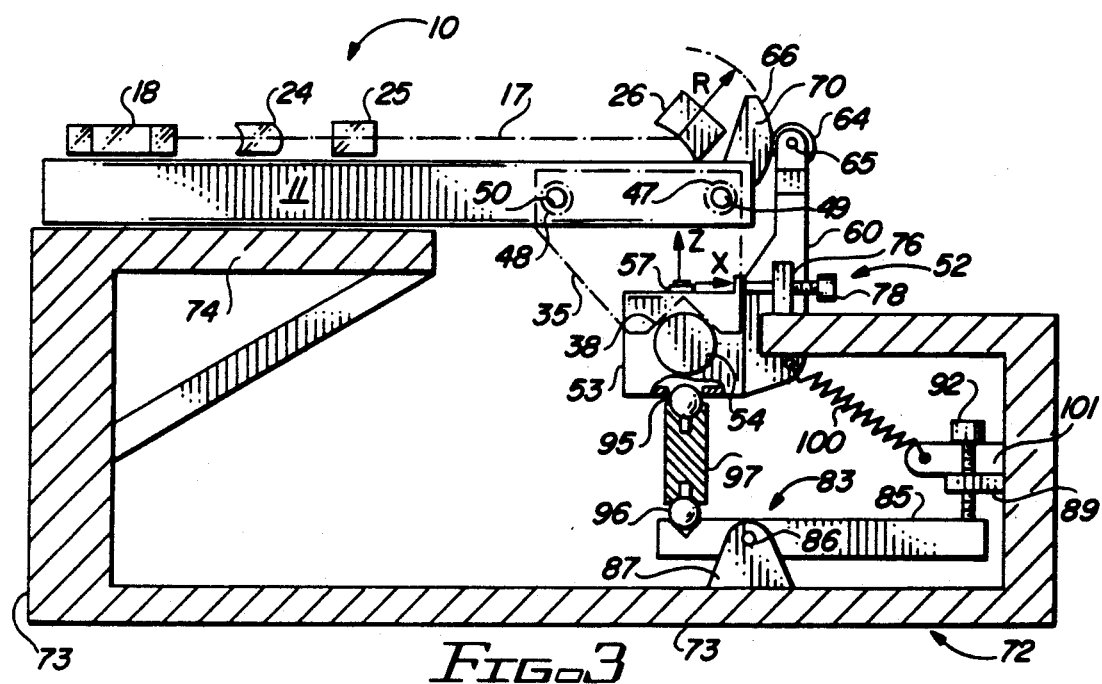
FIG. 3
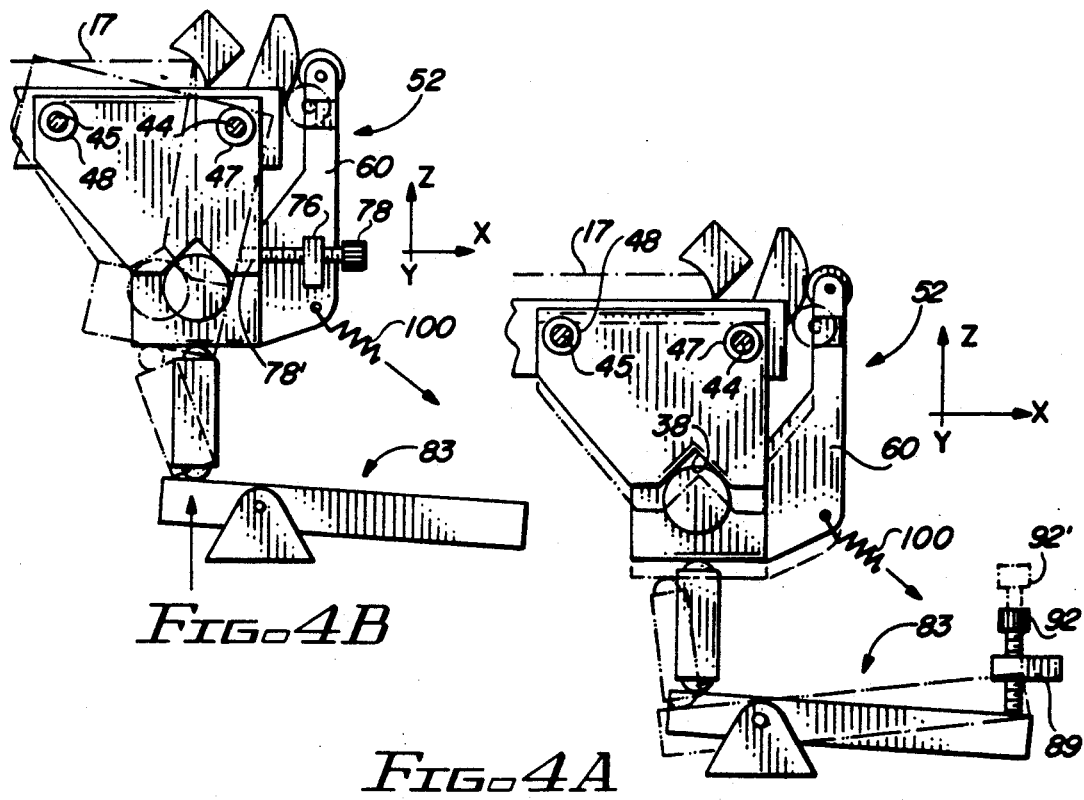
FIG. 4B
FIG. 4A

METHOD AND APPARATUS FOR ALIGNMENT OF SCAN LINE OPTICS WITH TARGET MEDIUM USING EXTERNAL ADJUSTING MEMBERS

TECHNICAL FIELD

This invention relates generally to a method and apparatus for accurately positioning scan line generating optics relative to an intended scan line receiving target medium; and, in particular, to a "drop-in" optics module for a polygon printer or the like, settable using external adjustment means, for accurately locating the generated scan line relative to a photosensitive recording medium carried on a rotating drum.

BACKGROUND ART

The positioning of a raster scan line, like that generated by the optics of a polygon laser printer such as shown in U.S. patent application Ser. No. 07/637,429, filed Jan. 4, 1991, onto an x-ray film or other photosensitive image recording medium involves assuring accurate alignment in the x (cross-scan), y (scan) and z (beam path) translational directions, as well as in the $\theta_x$, $\theta_y$ and $\theta_z$ rotational directions respectively about each of the x, y and z directions. Proper positioning also requires attainment of the right angle of incidence of the beam onto the target medium.

Excessive focal shift errors of the scan line with respect to the recording medium can lead to a printing artifact called banding. Banding is an undesirable periodic density modulation in the image that is most noticeable in uniform density regions. A very high degree of accuracy of scan line placement is required especially for laser printers used for x-ray films, because banding artifacts can lead to false diagnoses. The eye is very sensitive to low frequency (1-8 cycles/degree) contrast modulation, having a threshold as low as 0.2% under the right illumination conditions. The design goal typically will use half this tolerance, so it will have 0.1% allowable line shift for the extreme polygon facet error. For a printer with a line pitch of 0.08 mm, the allowable error is thus only $80 \times 10^{-9}$ mm. This requirement means that only a very small focus error can be present for the page cross section of the beam.

Antos et al. U.S. Pat. No. 4,397,521 discloses a polygon raster scanner having a pair of adjustable screws which cooperate with a leaf spring to precisely aim a laser beam toward the optical system. Jeffery et al. U.S. Pat. No. 4,043,632 discloses a polygon mirror with adjustable facets. Kramer U.S. Pat. No. 4,826,268 discusses banding in a hologon scanner. Oosaka et al. U.S. Pat. No. 3,922,060 discloses the use of slidable "v" pads for accurate motion of a movable stage for an optical bench in hologram recorder. Other patents describing related subject matter include the following U.S. Pat. Nos.: 4,040,096; 4,239,326; 4,243,293; 4,304,459; 4,487,472; and 4,904,034.

Scan line generating optics systems are susceptible to two types of focusing errors: those which cause deviations of the scan curve from a straight line; and those which displace the scan line from its intended generatrix line on the target drum. The f-$\theta$ condition correcting and other optical elements can be manufactured with sufficiently tight tolerances and alignment procedures to ensure the generation of an acceptably straight (i.e. non-arcuate) scan line in space.

U.S. patent application Ser. No. 07/785,346, filed Oct. 31, 1991, discloses a novel method and apparatus for ensuring the proper placement of a scan line generated by the optics of a polygon laser printer onto a recording medium supported on a rotating drum. An inexpensive mechanism is provided for adjustably setting the x, z, $\theta_x$, $\theta_z$ and angle of incidence positioning of the scan line. Beam source, shaping and scanning optics are mounted on a rigid module and adjustable means is provided to mechanically rigidly connect the optics module to the drum. In a preferred embodiment described in the '346 application, the connection is provided by two inverted V-notched blocks that are selectively positionable relative to the module frame and which are brought into nesting relationship onto cylindrical surfaces of bearings mounted coaxially with the drum shaft. Positioning of the blocks is controlled by adjustment screws and springs located on the module itself, with adjustments made utilizing a drum simulating external quad cell device.

Utilizing wholly on-board means for adjusting the notched blocks relative to the optics module introduces unnecessary complexity into the construction of the optics module frame. Moreover, having all block adjustment elements included with each module requires unnecessary duplicity or parts, not normally required on site after installation on a particular printer drum is complete.

DISCLOSURE OF THE INVENTION

It is an object of the present invention to provide an improved method and apparatus for ensuring the proper placement of a scan line generated by the optics of a polygon laser printer or the like onto a recording medium mounted on a rotating drum or other target medium supporting mechanism.

It is a further object of the invention to provide an inexpensive mechanism, utilizing off-board elements, for adjustably setting the x, z, $\theta_x$, $\theta_z$ and angle of incidence positioning, relative to a recording medium supported on a rotating drum, of a scan line generating optics module of a polygon printer.

In accordance with one aspect of the invention, beam source, shaping and scanning optics of a polygon printer are mounted on a rigid module and arranged to generate a raster scan line in space. An adjustable connection is provided to mechanically rigidly connect a frame of the optics module relative to a printer target drum. Off-board means are provided to set the adjustable connection so that the generated scan line is accurately placed onto a recording medium supported for scanning on the drum. In a preferred embodiment, described in greater detail below, an adjustable connection is provided by two inverted V-notched blocks that are selectively positionable relative to the module frame and which are brought into nesting relationship onto cylindrical surfaces of bearings mounted coaxially with the drum shaft. A drum-simulating quad cell fixture, selectively positionable utilizing means external to the optics module, is used to set the x and z direction positions of the blocks relative to the module frame and to each other, in order to set the x, z, $\theta_x$ and $\theta_z$ directional positioning of the module-generated scan line relative to the drum.

BRIEF DESCRIPTION OF THE DRAWINGS

Embodiments of the invention have been chosen for purposes of illustration and description, and are shown with reference to the accompanying drawings, wherein:

FIG. is an exploded perspective view of a drop-in optics module in accordance with the invention employed with a printer having a rotating drum;

FIG. 3 is a side view, with parts shown in phantom and section, of the module and fixture of FIG. 2; and FIGS. 4A and 4B are partial schematic side views of the module and fixture of FIG. 2, helpful in understanding the positional adjustment operation.

Throughout the drawings, like elements are referred to by like numerals.

MODES OF CARRYING OUT THE INVENTION

The principles of the invention are illustrated with reference to an exemplary implementation of apparatus suitable for proper positioning of the optics of a polygon printer relative to a photosensitive medium, such as an x-ray film mounted for line-to-line advancement on the cylindrical surface a rotating drum.

Figure 1:
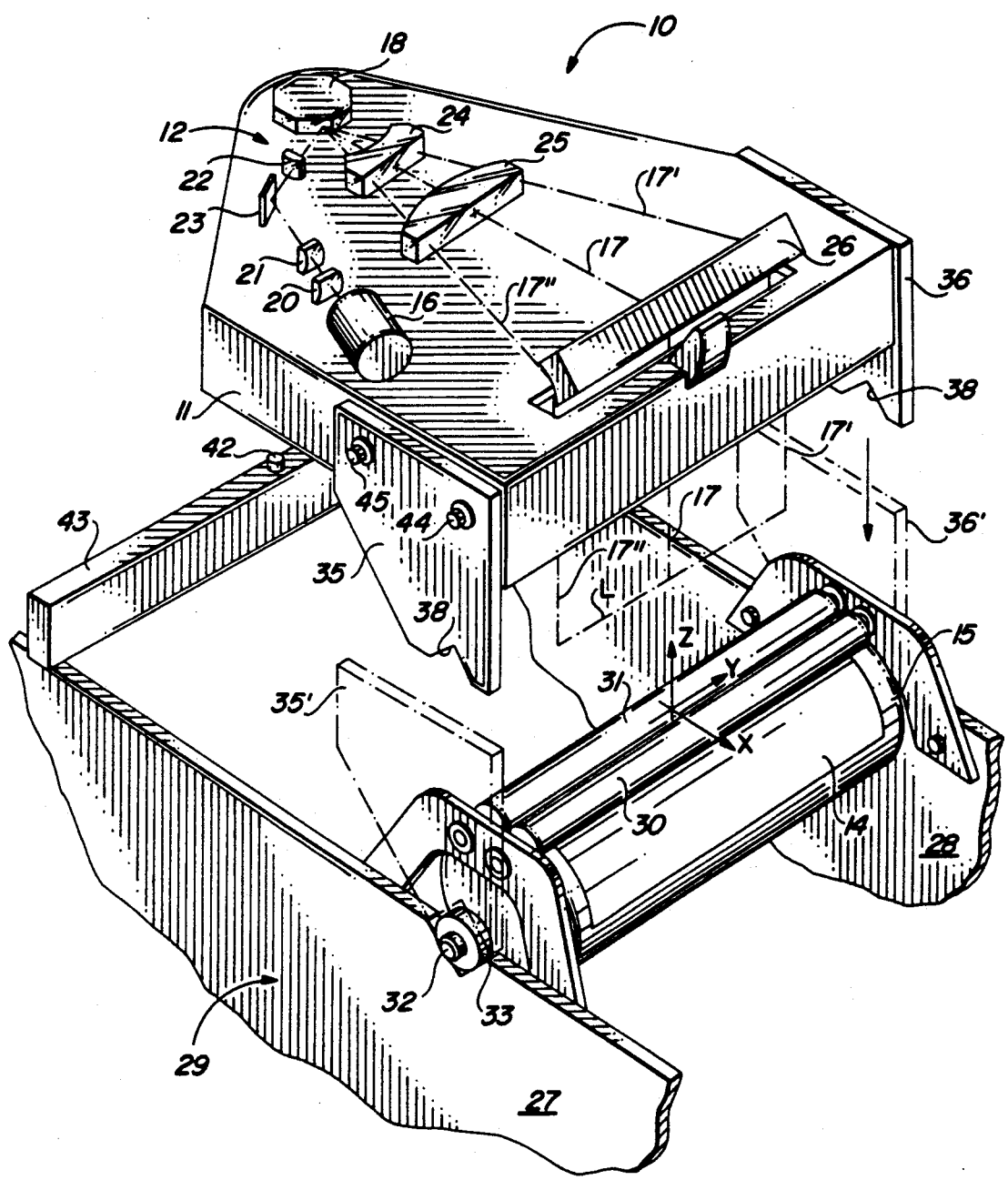
Figure 2:
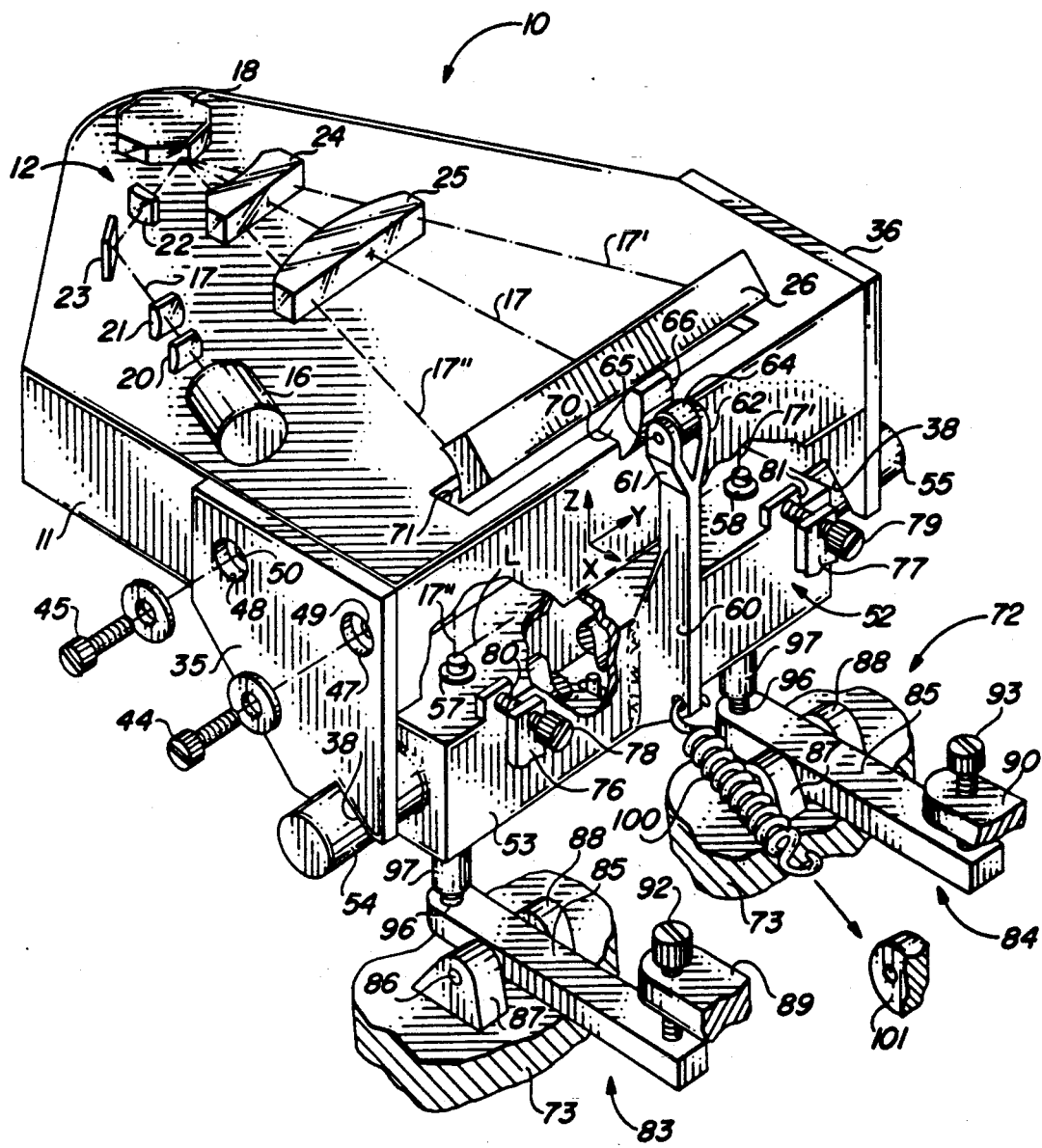
FIG. 2 is a perspective view of the optics module of FIG. 1, shown in place on a fixture usable for making positional adjustments.

As shown in FIGS. 1-3, a drop-in optics module 10 Comprises a rigid frame 11 on an upper surface of which are fixed, in typical arrangement, the elements of an optical system 12 suitable for generating a laser beam along a z (beam path or focus) direction, and scanning the same along a line L in the y (scan or page width) direction onto a film or similar medium 14. The medium 14 is supported for movement in an x (cross-scan or page length) direction on the outside cylindrical surface of a rotatable drum 15 (FIG. 1). The optical system 12 is configured to assure that the generated scan line L will be sufficiently straight for the intended printing purposes, and means are provided in accordance with the invention, as further described below, for adjustably rigidly mechanically connecting the module 10 and the drum 15 to achieve proper placement of the scan line L onto the medium 14.

In accordance with well-known principles, the optical system 12 includes an optical head 16 for projecting the beam of laser light along an optical beam path 17 (dot-dashed lines) coincident with the z direction. The beam 17 is modulated in accordance with information received from an image signal generating circuit (not shown), and scanned line-by-line in the y direction (from 17' to 17") onto the medium 14 by means of a rotating polygon 18. A start-of-scan detector (not shown) controls the timing of the light beam modulation. Optical elements, comprising lenses 20, 21, 22 and folding mirror 23, control the shape, focus and path of the beam 17 between the optical head 16 and mirrored multiple facets of the polygon 18. Optical elements, comprising lenses 24, 25 and mirror 26 located between polygon 18 and drum 15, correct for differences in beam focus in the y direction due to the f-$\theta$ condition and correct for displacements of the image in the x direction due to pyramid facet out-of-plane wobble and angle errors. The invention is directed at eliminating focal errors that may occur due to misplacement of the optics generated scan line L, and is an improvement over the embodiments described in U.S. patent application Ser. No. 07/785,346, filed Oct. 31, 1991. The addressed errors are those due to deviations from normal (or other desired) angle of incidence of beam 17 with the recording medium 14; and those due to misplacement in the $\theta_x$ and $\theta_z$ rotational and x and z translational directions of the delivered scan line from its intended placement on the recording medium 14. The improvement over the embodiments disclosed in the '346 application resides in the means employed to make the error correcting adjustments.

The drum 15 is mounted on shaft 32, journalled for rotation between opposing walls 27, 28 of the printer body 29 (FIG. 1). Pressure rollers 30, 31 are rotatably supported in spaced alignment between the same walls 27, 28, to ride along the cylindrical surface of drum 15 for the purpose of holding the medium 14 against the drum 15 on either side of the scan line L. Left and right ends of the drum shaft 32 have bearings 33 which provide cylindrical reference surfaces for receiving the adjustable mechanical connection between the frame 11 and the drum 15.

As shown in FIGS. 1-3, the depicted mechanical connection has two x-z planar mounting blocks or plates 35, 36 which depend vertically, respectively from left and right sides of a front portion of the frame 11. Each block 35, 36 includes a lower end having an upwardly-directed, inverted V-notch 38 of isosceles triangular shape having an interior angle of 90°. The notches 38 are dimensioned, configured and adapted to be received in two-point tangential abutment over the cylindrical surfaces of the respective bearings 33, as illustrated by the dot-dot-dashed positions 35', 36' of blocks 35, 36 in FIG. 1. The downward extensions or z directional positions of blocks 35, 36 relative to frame 11 act to establish the z and $\theta_z$ directional positions of frame 11 relative to the drum 15 and medium 14. The x directional positions of the blocks 35, 36 relative to the frame 11 act to establish the x and $\theta_z$ directional positions of frame 11 relative to the drum 15 and medium 14. The undersurface at the rear of frame 11 rests on an upwardly projecting locator pin 42 positioned under polygon 18 on a beam 43 which connects the printer walls 27, 28. Beam 43 serves as a stop, when blocks 35, 36 are nested on bearings 33, to prevent rotation of the frame 11 due to the moment of the weight of the rear of frame 11 acting about the rotational axis of shaft 32. The undersurface of the frame 11 rests on the end of pin 42 to establish the $\theta y$ directional position of the frame 11 relative to the drum 15 and medium 14.

In order to make the x, z, $\theta_x$, $\theta_z$ positioning of frame 11 relative to the medium 14 adjustable, the blocks 35, 36 are made selectively independently adjustable in the x and z directions relative to frame 11. As shown, laterally-spaced, front and rear y direction clamping screws 44, 45 are respectively passed through oversized holes 47, 48 of blocks 35, 36 into threaded engagement with y direction bores 49, 50 formed in frame 11 (see FIGS. 2 and 3). Holes 47, 48 are oversized to permit shifting of blocks 35, 36 in both x and z directions relative to the shanks of the screws 44, 45 that pass therethrough.

The mechanical connection established by blocks 35, 36 between the scan optics frame 11 and the drum 15 provides a short and stiff rigid mounting. The weight of the frame 11 will cause the notches 38 to nest against the bearings 33 and the rear of frame 11 at pin 42 to nest against the beam 43, to constrain the module 10 in x, z, $\theta_x$, $\theta_y$, $\theta_z$ directions. Constraint of module 10 in the y direction can be provided by any suitable means, such as a notch-to-pin constraint like that disclosed in the '346 application. Spring clips (not shown) connected between the frame 11 or blocks 35, 36 and the printer body 29 can be used to augment the nesting force.

The procedure for accurately positioning the scan line L generated by the optics system 12 relative to the scan line receiving medium 14 can be understood with reference to FIGS. 2-4B. For setting the positions of blocks 35, 36 relative to frame 11, an alignment fixture 52 (FIGS. 2 and 3) is utilized to simulate the drum 15. The fixture 52 comprises a rectangular cross-sectioned body member 53 connecting two coaxially-aligned cylindrical ends 54, 55 which have cylindrical surfaces of the same diameter as drum bearings 33. A plurality of light beam sensors, such as an arrangement of two quad cells 57, 58, are located on an upper surface of body member 66 intermediate the ends 54, 55 in radially facing positions, in line with the coaxial axes of ends 54, 55. For the two quad cell arrangement shown, the quad cells 57, 58 are spaced radially from the axes of ends 54, 55 by a distance equal to the radius of drum 15 plus the thickness of the recording medium 14. The quad cells 57, 58 are spaced longitudinally from each other by a distance preferably corresponding to 70-100% of the width of the scan line L (i.e. the distance between beam positions 17' and 17"). Additional quad cells may be employed.

The fixture 52 is oriented with the axes of ends 54, 55 aligned with the y direction. An upwardly-extending bifurcated member 60 positioned centrally of the body 53 has spaced arms 61, 62 between which is located a wheel 64 journalled for rotation about a pin 65 extending in the y direction. The member 60 is dimensioned, configured and adapted to locate the rolling surface of wheel 64 in contact with a cylindrical surface 66 coincident with an arc of radius R (FIG. 3) drawn in the $\theta_y$ direction about a point centrally located on the reflective surface of mirror 26. The wheel 64 cooperates with the surface 66 so that rotation of the body member 53 in the $\theta_y$ direction, while maintaining contact of wheel 64 with surface 66, will keep the quad cells 57, 58 always pointed to receive the beam 17 with the same angle of incidence. For the illustrated radial orientation of the quad cells 57, 58 relative to the ends 54, 55 of the fixture 52, that angle of incidence will always be normal to the drum 15 surface. (It will, of course, be appreciated by those skilled in the art that the fixture 52 can be configured to maintain an angle of incidence that is constant at an angle other than normal.) The arced surface 66 is conveniently provided on an upward extension 70 formed at the front of the frame 11, ahead of the mirror 26 and downward beam path opening 71 (FIG. 2).

For setting the positioning of the blocks 35, 36 (and, thus, the positioning of fixture 52) relative to the frame 11, an adjustment assembly 72 is provided. As shown in FIGS. 2 and 3, the assembly 72 comprises a support structure 73 having means for holding frame 11 fixed in stationary position during the positioning adjustment procedure. For the illustrated embodiment, this is done by providing a horizontally planar platform 74 in elevated position at the rear of structure 73, on which frame 11 can be supported with blocks 35, 36 depending freely therefrom. At the front of structure 73, lobes 76, 77 (FIG. 2) are located in general alignment with the positions of quad cells 57, 58. X direction adjustment screws 78, 79 are threaded through x direction bores of lobes 76, 77 so that free end tips of the screws 78, 79 abut rear surfaces of upwardly extending lobes 80, 81 formed on the fixture body 53.

The structure 73 also includes two spaced lever assemblies 83, 84 for z direction adjustment. The assemblies 83, 84 are respectively located in x and z alignment with the quad cells 57, 58. Each assembly 83, 84 comprises a lever arm 85 oriented in the x direction and being mounted for rotation about a y direction pin 86 supported between opposed pillars 87, 88 of a yoke attached to the support 73. Lobes 89, 90 of structure 73 project rearwardly over the front ends of arms 85, and z direction adjusting screws 92, 93 thread through z direction bores of lobes 89, 90 so that their free end tips respectively abut the top surfaces of the front ends of the arms 85. Double-ball socket arrangements comprising spherical elements 95, 96 respectively received within rounded sockets at opposite ends of a vertically extending spacer 97, connect the back end upper surfaces of arms 85 with the underside of body member 53 of fixture 52. Element 95 is received between the upper end socket of spacer 97 and a corresponding socket located on body 53 in radial alignment with quad cell 57 or 58. Element 96 is received between the socket of the lower end of spacer 97 and a corresponding socket formed in z direction alignment between the mirror 26 and the front end of arm 85 at the location of quad cell 57 or 58. Biasing of the lobes 80, 81 against the tips of screws 78, 79 is provided by the x direction component of a spring 100 that extends between a lower end of the bifurcated member 60 at the lower front of body member 53 and a spring anchoring post 101 formed below and forwardly on the structure 73. The z direction component of the same spring acts to bias the front ends of arms 85 upwardly against the tips of z direction adjustment screws 92, 93.

The frame 11, with blocks 35, 36 attached, is placed over the adjustment assembly 72. The clamping screws 56, 57 are loosened, causing the blocks 35, 36 to engage the fixture 52, with notches 38 brought into two-point tangential contact with the cylindrical surfaces of the fixture ends 54, 55. The initial positioning of the blocks 35, 36 is determined by the initial positioning of the fixture 52 supported by the double-ball and socket connections with arms 85. The z direction component of spring 100 urges the top surfaces of the front ends of arms 85 into contact with the tips of z direction adjustment screws 92, 93. The x direction component of spring 100 urges the front surfaces of lobes 80, 82 into contact with the tips of the x direction adjustment screws 78, 79. The same spring 100 also urges the wheel 64 of fixture 52 into rolling contact with the forwardly projecting arcuate surface 66 of upward extension 70 of frame 11.

As shown in FIG. 4A, to change the z position of block 35 relative to frame 11, screw 92 is moved in the z direction within lobe 89 toward or away from the top surface of the front end of arm 85, to a position 92' (from solid to dot-dot-dashed position). This movement causes a like change in the opposite direction of the z direction position of the back end of arm 85 which moves the quad cell 57 by a corresponding amount relative to the end 17" of scan line L (representing the same change of end 17" relative to one edge of the medium 14). Similarly, to change the z position of block 36 relative to frame 11, screw 93 is moved in the z direction within lobe 90 toward or away from the top surface of the front end of its corresponding arm 85. This movement causes a corresponding change in the z position of quad cell 58 relative to the end 17' of scan line L (representing the same change of 17' relative to the medium 14). The same screws 92, 93, thus, set the z direction position of scan line L relative to the medium 14 and, to the extent that the z direction adjustment of one block 35, 36 is different from that of the other block 35, 36, also set the $\theta_x$ position of scan line L relative to the medium 14.

As shown in FIG. 4B, movement of screw 78 within the lobe 76 in the x direction toward or away from the front surface of lobe 80 of fixture 52 changes the x position of the block 35 relative to frame 11 according to the change made in the x position of the quad cell 57 relative to the end 17" of scan line L (representing the same change in position of end 17" relative to the medium 14). Similarly, movement of screw 79 within the lobe 77 in the x direction toward or away from the front surface of lobe 81 of fixture 52 changes the x position of block 36 relative to frame 11 according to the change made in x position of the quad cell 58 relative to the end 17' of scan line L (representing the same change in position of end 17' relative to the medium 14). The screws 44, 45, thus, set the x direction position of scan line L relative to the medium 14 and, to the extent that the x direction adjustment of one block 35, 36 is different from that of the other block 35, 36, also set the $\theta_z$ position of scan line L relative to medium 14.

The rolling contact of wheel 64 with the arcuate surface 66, along with the movement flexibility provided by the double ball and socket connections between the arms 85 and the body 53, ensures that the angle of incidence of the beam 17 will remain the same (i.e., radial to the drum 15 and normal to the medium 14) for changes in the x positioning. The angular orientation is maintained because contact of wheel 64 with arcuate surface 66 is maintained, thereby rotating the radial orientation of quad cells 57, 58 about the radius R origin line on mirror 26. The constant radial orientation acts so that the rotation of fixture 52, with changes in x direction positioning, keeps the angle of incidence of beam 17 the same.

Once the independent settings of screws 78, 79, 90, 91 have been made, thereby establishing the x, z, $\theta_x$, $\theta_z$ positional relationships between the scan line L and the medium 14, the clamping screws 44, 45 are tightened to lock the blocks 35, 36 in their selectively adjusted positions relative to frame 11. Because of the simulation of the drum 15 by the fixture 52, these positional relationships will be maintained when the drop-in optics module 10 is subsequently mounted on the bearings 33 of the printer. The bearings 33 are arranged relative to the shaft 32 to have a spacing corresponding to the spacing of the blocks 35, 36 relative to the frame 11. As mentioned above, the beam 43 acts as a stop to prevent $\theta_y$ rotation of the frame 11 about the drum shaft 32. The y positioning of scan line L relative to the medium 14 can be controlled by means of the end-of-scan sensor, so is not that critical.

Those skilled in the art to which the invention relates will appreciate that other substitutions and modifications can be made to the described embodiment without departing from the spirit and scope of the invention as described by the claims below.

We claim:

1. For use with a printer, or, the raster scanning apparatus, having a body member; means, mounted on the body member and including two curved surfaces spaced in a y (scan) direction, for supporting the recording medium in an x (cross-scan) direction; a frame; means, mounted on the frame, for generating a beam along a z (beam path) direction and scanning the beam in the y direction along the scan line; and means, mechanically connecting the frame to the body member, for positioning the scan line onto the recording medium; the means for positioning the scan line including two blocks mounted on the frame and having upwardly-directed, inverted V-notches, dimensioned, configured and adapted to be respectively received in two-point tangential abutment onto the body member curved surfaces, and means for releasably locking the blocks relative to the frame; apparatus for enabling selective independent adjustments of the positions of the blocks relative to the frame; said apparatus being characterized in that it comprises:

means for holding the frame fixed in stationary position;

a fixture having two curved surfaces spaced in the y direction and configured to correspond to the curved surfaces of the body member, the fixture also including a plurality of light beam sensors located in longitudinally-spaced positions, intermediate the curved surfaces; and means, external to the frame and body member, for enabling selective independent adjustments of the positions of the fixture curved surfaces in the x and z directions relative to the frame fixed by the holding means, with the notches received in two-point tangential abutment onto the fixture curved surfaces.

2. Apparatus for use with a printer, or other raster scanning apparatus, as in claim 1, further comprising means, cooperative with the means for enabling selective independent adjustments of the fixture, and located external to the frame and body member, for maintaining a constant angle of incidence of the scan line onto the light beam sensors when the notches are received in two-point tangential abutment onto the fixture curved surface.

3. Apparatus for use with a printer, or other raster scanning apparatus, as in claim 1, wherein the means for enabling independent adjustments of the fixture in the x direction comprises a support structure; two x direction adjustment elements, means mounting the x direction adjustment elements on the support structure for selective respective independent movement in the x direction against the fixture; and means, operating between the fixture and the support structure, for biasing the fixture against the x direction adjustment elements.

4. Apparatus for use with a printer, or other raster scanning apparatus, as in claim 3, wherein the means for enabling independent adjustments of the fixture in the z direction comprises two z direction adjustment elements; means mounting the z direction adjustment elements on the support structure for selective respective independent movement in the z direction against the fixture; and means, operating between the fixture and the support structure, for biasing the fixture against the z direction adjustment elements.

5. Apparatus for use with a printer, or other raster scanning apparatus, as in claim 4, wherein the means for biasing the fixture against the x direction adjustment elements comprises a spring connected between the fixture and the support structure for asserting a force having a component in the x direction.

6. Apparatus for use with a printer, or other raster scanning apparatus, as in claim 5, wherein the means for biasing the fixture against the z direction adjustment elements comprises the spring being connected so that the force also has a component in the z direction.

7. Apparatus for use with a printer, or other raster scanning apparatus, as in claim 4, wherein the plurality of sensors comprises two sensors; and the x direction adjustment elements are mounted on the support structure for contacting the fixture at locations respectively proximate the two sensors.

8. Apparatus for use with a printed, or other raster scanning apparatus, as in claim 7, wherein the z direction adjustment elements comprise elements mounted on the support structure for contacting the fixture at other locations likewise respectively proximate the two sensors.

9. Apparatus for use with a printer, or other raster scanning apparatus, as in claim 8, wherein the x direction adjustment elements further comprise x direction adjustment screws; and the z direction adjustment elements further comprise z direction adjustment screws, and lever elements connected between the z direction adjustment screws and the fixture.

10. Apparatus for use with a printer, or other raster scanning apparatus, as in claim 9, wherein the lever elements comprise levers having opposite ends and portions intermediate the opposite ends; means mounting the intermediate portions to the support structure for pivotal movement about a y direction axis; and double-ball socket assemblies; the z direction adjustment screws being arranged to bear against ones of the lever opposite ends and the double-ball socket assemblies being located between the fixture and others of the lever opposite ends.

11. Apparatus for use with a printer, or other raster scanning apparatus, as in claim 10, wherein the frame further includes a curved surface; and the fixture further comprises a wheeled member, and means biasing the wheeled member into contact with the frame curved surface when the notches are received in two-point tangential abutment onto the fixture curved surfaces; the wheeled member and frame curved surface being relatively dimensioned, configured and adapted for maintaining a constant angle of incidence of the scan line onto the light beam sensors when the notches are received in two-point tangential abutment onto the fixture curved surfaces.

12. Apparatus for use with a printer, or other raster scanning apparatus, as in claim 11, wherein the wheeled member extends upwardly, centrally of the fixture; and the frame curved surface is an arc having a curvature centered about a point located on the beam generating and scanning means.

13. Apparatus for enabling the selective independent adjustment of releasably locked positions of notched blocks utilized for nesting a frame of a scan line generating optics system onto curved surfaces of a printer, or other raster scanning apparatus, to position the generated scan line in x (cross-scan), z (beam path), $\theta_x$ and $\theta_z$ directions relative to a recording medium supported on a rotatable drum; the apparatus being characterized in that it comprises:

means for holding the frame fixed in stationary position;

a fixture having curved surfaces configured to correspond to the curved surfaces of the printer and including a plurality of light beam sensors located in longitudinally-spaced positions intermediate the fixture curved surfaces;

means, external to the frame, for enabling selective independent adjustments of the positions of the fixture curved surfaces in the x direction relative to the frame, and for maintaining a constant angle of incidence of the scan line onto the light beam sensors, when the frame is fixed by the holding means and the notches are received in two-point tangential abutment onto the fixture curved surfaces; and means, external to the frame, for enabling selective independent adjustments of the positions of the fixture curved surfaces in the z direction relative to the frame when the frame is thus fixed by the holding means and the notches are thus received in two-point tangential abutment onto the fixture curved surfaces.

14. Apparatus as in claim 13, wherein the means for enabling independent adjustments of the fixture in the x direction comprises a support structure; two x direction adjustment screws; means mounting the x direction adjustment screws on the support structure for selective respective independent movement in the x direction against the fixture; and means, operating between the fixture and the support structure, for biasing the fixture against the x direction adjustment screws.

15. Apparatus as in claim 14, wherein the means for enabling independent adjustments of the fixture in the z direction comprises two z direction adjustment screws; levers having opposite ends and portions intermediate the opposite ends; means mounting the intermediate portions to the support structure for pivotal movement about a y direction axis; means mounting the z direction adjustment screws on the support structure for selective respective independent movement in the z direction against ones of the lever opposite ends; and double-ball socket assemblies located between the fixture and others of the lever opposite ends.

16. Apparatus as in claim 15, wherein the frame further includes a curved surface; and the fixture further comprises a wheeled member, and means biasing the wheeled member into contact with the frame curved surface when the notches are received in two-point tangential abutment onto the fixture curved surfaces; the wheeled member and frame curved surface being relatively dimensioned, configured and adapted for maintaining a constant angle of incidence of the scan line onto the light beam sensors when the notches are received in two-point tangential abutment onto the fixture curved surface.

17. Apparatus as in claim 16, wherein the wheeled member extends upwardly, centrally of the fixture; and the frame curved surface is an arc having a curvature centered about a point located on the scan line generating optics system.

* * * * *